(12) United States Patent
Faxér et al.

(10) Patent No.: US 10,349,287 B2
(45) Date of Patent: Jul. 9, 2019

(54) ADAPTIVE SECTOR CONFIGURATION OF AN ADAPTIVE ANTENNA SYSTEM

(71) Applicant: Telefonaktiebolaget LM Ericsson (publ), Stockholm (SE)

(72) Inventors: Sebastian Faxér, Järfälla (SE); Pradeepa Ramachandra, Linköping (SE); Kristina Zetterberg, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/549,273

(22) PCT Filed: Mar. 3, 2015

(86) PCT No.: PCT/EP2015/054332
§ 371 (c)(1),
(2) Date: Aug. 7, 2017

(87) PCT Pub. No.: WO2016/138934
PCT Pub. Date: Sep. 9, 2016

(65) Prior Publication Data
US 2018/0041908 A1 Feb. 8, 2018

(51) Int. Cl.
*H04W 16/28* (2009.01)
*H04W 16/18* (2009.01)
(Continued)

(52) U.S. Cl.
CPC .......... *H04W 16/28* (2013.01); *H04W 16/18* (2013.01); *H04W 24/02* (2013.01); *H04W 24/08* (2013.01); *H04W 72/046* (2013.01)

(58) Field of Classification Search
CPC .................................................. H04W 72/046
See application file for complete search history.

(56) References Cited

U.S. PATENT DOCUMENTS

| 2009/0323530 A1* | 12/2009 | Trigui ................. H04L 41/5025 370/235 |
| 2013/0235807 A1* | 9/2013 | Lee ........................ H04W 16/28 370/329 |
| 2016/0234693 A1* | 8/2016 | Yi .......................... H04W 16/08 |

FOREIGN PATENT DOCUMENTS

| WO | 2013134128 A1 | 9/2013 |
| WO | 2016124219 A1 | 8/2016 |

OTHER PUBLICATIONS

Nokia Networks, "Load information enhancements for AAS reconfiguration decisions", 3GPP TSG-RAN WG3 Meeting #86, Nov. 17-21, 2014, pp. 1-2, San Francisco, US, R3-142715.

(Continued)

*Primary Examiner* — Kevin M Cunningham
(74) *Attorney, Agent, or Firm* — Coates & Bennett, PLLC

(57) ABSTRACT

The present disclosure relates to methods, arrangements and computer programs for antenna sector configuration for an adaptive antenna system, AAS. A method, performed in a network node, comprises associating (35) wireless devices served from the network node to sectors of a respective sector configuration model based on radio network measurements, wherein the association is performed for each out of a number of sector configuration models. The method further comprises estimating (S37) performance metrics for each sector configuration model based on the associating of wireless devices to sectors of the respective sector configuration model and selecting (S37) an antenna sector configuration of the AAS based on the estimated performance metrics.

14 Claims, 9 Drawing Sheets

(51) Int. Cl.
   *H04W 24/02*   (2009.01)
   *H04W 24/08*   (2009.01)
   *H04W 72/04*   (2009.01)

(56) References Cited

OTHER PUBLICATIONS

Saraydar, C. et al., "Adaptive Cell Sectorization for CDMA Systems", IEEE Journal on Selected Areas in Communications, Jun. 2001, pp. 1041-1051, vol. 19, No. 6.
LG Electronics, Inc., "Further consideration on cell shaping", 3GPP TSG-RAN WG3 Meeting #87, Nov. 9-13, 2015, pp. 1-2, R3-150262.
Spaey, K. et al., "SON Functions for Multi-Layer LTE and Multi-RAT Networks (Final Results)", INFSO-ICT-316384 SEMAFOUR D4.2, Aug. 2014, pp. 1-164.

* cited by examiner

ADAPTIVE SECTOR CONFIGURATION OF AN ADAPTIVE ANTENNA SYSTEM

TECHNICAL FIELD

The present disclosure relates to methods, arrangements and computer programs for antenna sector configuration for an adaptive antenna system, AAS.

BACKGROUND

The 3rd Generation Partnership Project, 3GPP, is responsible for the standardization of the Universal Mobile Telecommunication System, UMTS, and Long Term Evolution, LTE. The 3GPP work on LTE is also referred to as Evolved Universal Terrestrial Access Network, E-UTRAN. LTE is a technology for realizing high-speed packet-based communication that can reach high data rates both in the downlink and in the uplink, and is thought of as a next generation mobile communication system relative to UMTS. LTE brings significant improvements in capacity and performance over previous radio access technologies and are being deployed extensively by operators to meet the increasing demand by consumers.

The modernization of antenna technologies in practice is moving forward in a high pace, which enables the use of more advance antenna setups and techniques in order to increase capacity and performance in a mobile radio network. With the development of modern Active Antenna Systems, AAS, several new capacity enhancing features are enabled. One of these features is the possibility to redefine cells. A cell in this context, hereinafter also referred to as a sector, is defined by a cell-specific reference signal, CRS, transmitted at a frequency carrier.

With the use of AASs, which are already available in practice, sectorization is made possible; splitting a single cell in the network into a plurality of cells or sectors. The use of sectorization is a well-established way to increase the capacity of a cellular network. By using directional radiation beam patterns, the coverage area is divided into several sectors. The different sectors are allowed to use the same time and frequency resources thereby increasing the capacity of the network. A standard deployment is to use three directional antennas per site, but other types of deployments are also foreseen.

With the introduction of adaptive antenna systems, AAS, wherein each antenna consists of a number of active elements, comes an ability to dynamically change sectorization so that each antenna can transmit several beams directed differently, and where each beam acts as a separate cell that can reuse the time and frequency resources. The sectorization is done in a horizontal and/or vertical plane, but a horizontal sectorization may of course also have an impact in a vertical plane and vice versa.

The gains that can be achieved with such sectorization are promising and seem to be of great importance to achieve the goals of future radio networks. The benefits from sectorization mainly come from the spatial reuse of resources and also from the interference reduction to the neighbours. However, there is also a cost of sectorization from inter-sector interference and reduction in transmission power per sector since the total amount of power available has to be shared between the sectors. Thus, sectorization is not always beneficial.

The leveraging of the benefit and cost is an important aspect for successful sectorization. It is known that the user distribution can help in taking a sectorization or antenna reconfiguration decision; see e.g. 3GPP TSG-RAN WG3 Meeting #86, San Francisco, USA, Nov. 17-21, 2014, R3-142715—Load information enhancements for AAS reconfiguration decisions, disclosing how a decision to sectorize or not to sectorize is based on fixed thresholds.

Existing methods also include acquiring information about the load of different sectors by sending out beam-formed reference signals, such as DRS or CSI-RS, and decide cell association of UEs based on measurement reports obtained from those reference signals. Using DRS/CSI-RS for acquiring estimates about UE serving sectors will create some overhead. Further, in case of a high number of possible sector configurations, many configurations need be tried. Further, it is not supported by legacy UEs.

There is a need for improved adherence between sector set up and traffic situation in a wireless network; an improved ability to adapt sectorization decisions to user distribution.

SUMMARY

It is an object of the present disclosure to provide a method, network node and computer-readable storage medium which seeks to mitigate, alleviate, or eliminate one or more of the above-identified deficiencies in the art and disadvantages singly or in any combination.

This object is achieved by a method, performed in a network node, of selecting antenna sector configuration for an adaptive antenna system AAS. The method comprises associating wireless devices served from the network node to sectors of a respective sector configuration model based on radio network measurements, wherein the association is performed for each out of a number of sector configuration models. The method further comprises estimating performance metrics for each sector configuration model based on the associating of wireless devices to sectors of the respective sector configuration model and selecting an antenna sector configuration of the AAS based on the estimated performance metrics.

The disclosed operations enables a centralized or distributed network entity, e.g. a network node, to adaptively over time choose the best performing sector configuration for a network node. The disclosed operations simplify the process for selecting an antenna sector configuration model for the AAS, and also for de-selecting a previously selected sector configuration model or updating a decision to continue with an unchanged antenna sector configuration model, e.g. wherein the eNB provides coverage in one cell only. The decision making process of whether to turn on or turn off sectorization for the cell under consideration will be adaptable to spatial and temporal changes in the coverage area of the cell. Consequently, the operations provide for better use of the adaptive antenna system and the capabilities of an AAS.

According to further aspects of the disclosure, the method comprises determining an actual association of wireless devices to sectors of the selected antenna sector configuration and updating a sector configuration model corresponding to the selected antenna configuration model based on the actual association. According to aspects of the disclosure, further sector configuration models are updated based on the determined performance metrics. According to aspects, updating is performed for one or more sectorization thresholds used to associate the wireless devices to sectors of respective configuration models.

The present disclosure addresses the short-comings of present static sectorization methodology, and improves performance of sectorization methodologies by enabling threshold updates based on a observed actual events and outcome. Previous sectorization thresholds are static and require manual input when found to be deficient. Using the adaptive models proposed herein, such manual input is eliminated at the same time as feedback relevant for adaptively updating a sectorization methodology is provided.

The method comprises selecting an antenna sector configuration of the AAS. According to some aspects of the disclosure, the selecting is based on a comparison of estimated performance metrics for each configuration model, a comparison of estimated performance metrics for each configuration model and the determined performance metrics, and/or a comparison of the estimated performance metrics and a configurable performance threshold. According to aspects of the disclosure, performance metrics comprise load, throughput and/or latency.

The present disclosure presents solutions wherein a plurality of sector configuration models may be considered and legitimately compared in the selection of an antenna sector configuration.

According to aspects of the disclosure, the method also comprises determining performance metrics for wireless devices served from the network node and/or deriving wireless specific statistics indicative of a distribution of wireless devices served from the network node. According to some aspects of the disclosure, the wireless device specific statistics are derived from the determined performance metrics, from wireless device measurements received in the network node or from network node measurements. Such wireless device measurements comprise Reference Signal Received Power, RSRP, measurements, Precoder Matrix Indicator, PMI, measurements, position measurements and/or timing advance measurements. Network node measurements comprise propagation direction and/or propagation delay of the radio signal received from the wireless device.

The present disclosure presents solutions wherein state of the art performance measurements and metrics are used for selecting an antenna sector configuration of an AAS. Consequently, signalling overhead from the proposed solutions is insignificant.

According to aspects of the disclosure, the wireless devices are associated to the sectors of the respective sector configuration model by comparing derived wireless device specific statistics to one or more sectorization thresholds for the sectors of the respective sector configuration model. The sector configuration models are determined from a sectorization capability of the AAS according to some aspects of the disclosure.

The present disclosure presents solutions benefitting from the full capability of an AAS and full set of sector configurations possible for the AAS.

According to an aspect of the disclosure, sectorization thresholds are defined for one or more parameters representative of respective uptake areas for sectors in a sector configuration model and wherein the wireless device specific statistics is derived for the one or more parameters. According to some aspects of the disclosure, the uptake areas comprise horizontal uptake areas and/or vertical uptake areas. According to further aspects, one sectorization threshold represents a sectorization between first and second subset of sectors in a sector configuration model and according to an option, another sectorization threshold represents a sectorization between a third and fourth subset of sectors in a sector configuration model and wherein the third and/or fourth subset of sectors include sectors of the first and/or second subset.

The present disclosure presents solutions capable of evaluation a variety of complex sectorization scenarios of an AAS.

The object of the disclosure is also achieved by a network node comprising processing circuitry operative to select an antenna sector configuration for an adaptive antenna system, AAS, of the network node. The processing circuitry is adapted to associate wireless device served from the network node to sectors of respective sector configuration model based on radio network measurements, wherein the association is performed for each out of a number of sector configuration models. The processing circuitry is further adapted to estimate performance metrics for each sector configuration model based on the associating of wireless devices to sectors of the respective sector configuration model and to select an antenna configuration of the AAS based on the estimated performance metrics.

The object of the disclosure is also achieved by a computer-readable storage medium having stored thereon a computer program which, when run in a network node, causes the network node to perform the previously disclosed method.

The network node and the computer-readable storage medium each display advantages corresponding to advantages described for the corresponding methods and aspects of the methods.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein. It should be appreciated that all of the example embodiments presented herein may be applicable to any adaptive antenna system used in a cellular network.

In order to provide a better explanation of the example embodiments presented herein, a problem will first be identified and discussed.

Figure 1A:
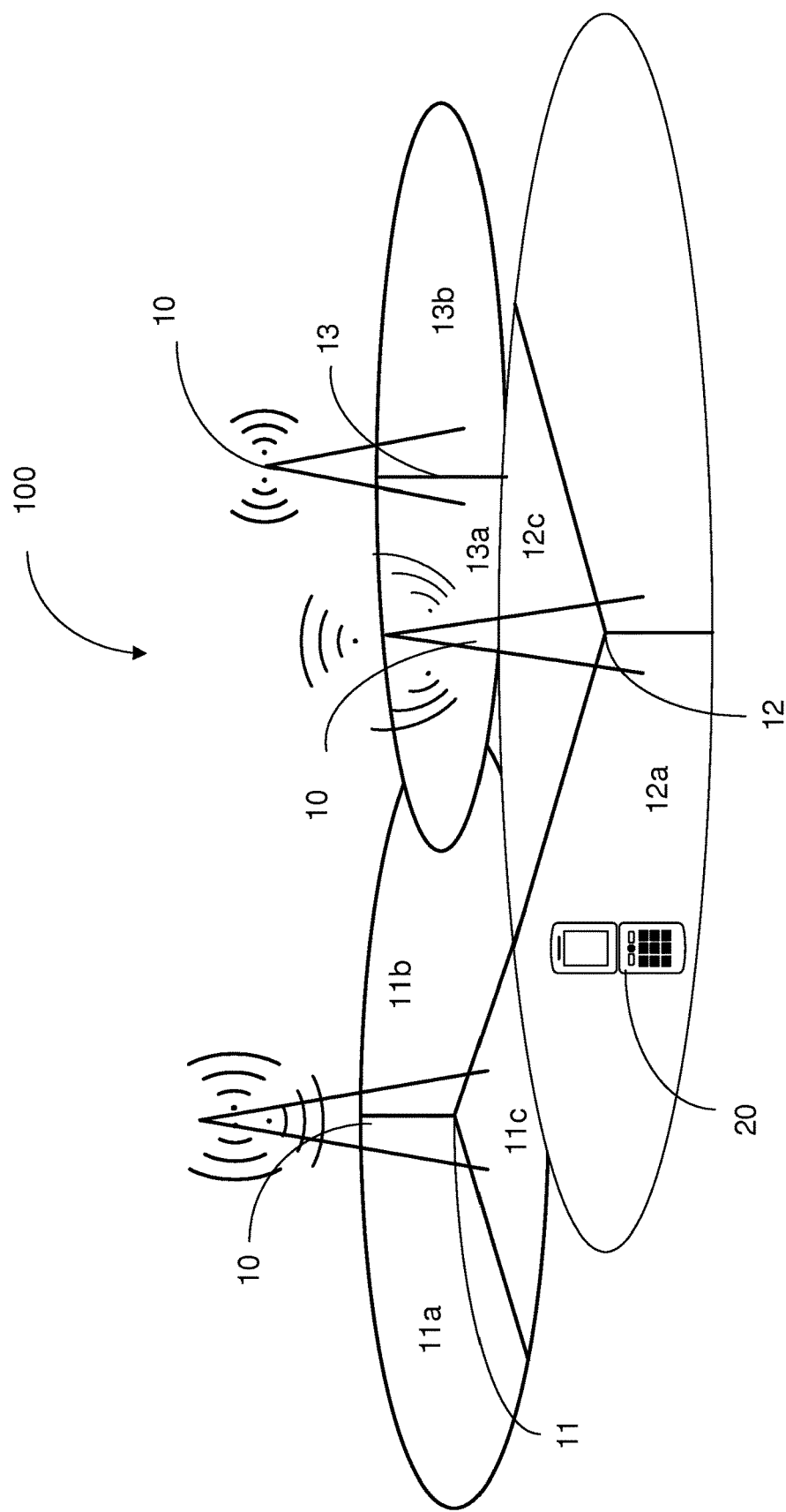
FIG. 1
a) schematically illustrates an exemplary cellular communication network, where the proposed methods may be implemented,
b) schematically illustrates a side view of a network node configured for a sector configuration with four sectors,
c) schematically illustrates a top view of FIG. 1b.

FIG. 1 discloses an exemplary LTE wireless network 100. A wireless device 20, in the following also presented as a user equipment, UE, 20 is arranged for data transmission over an air interface to one or several network nodes 10, e.g. a radio base station, RBS or an evolved node B, eNB each network node capable of providing coverage in one or more cells, here illustrated as cells 11-13 with sectors 11a-c, 12a-c and 13a,b.

Figure 1B:
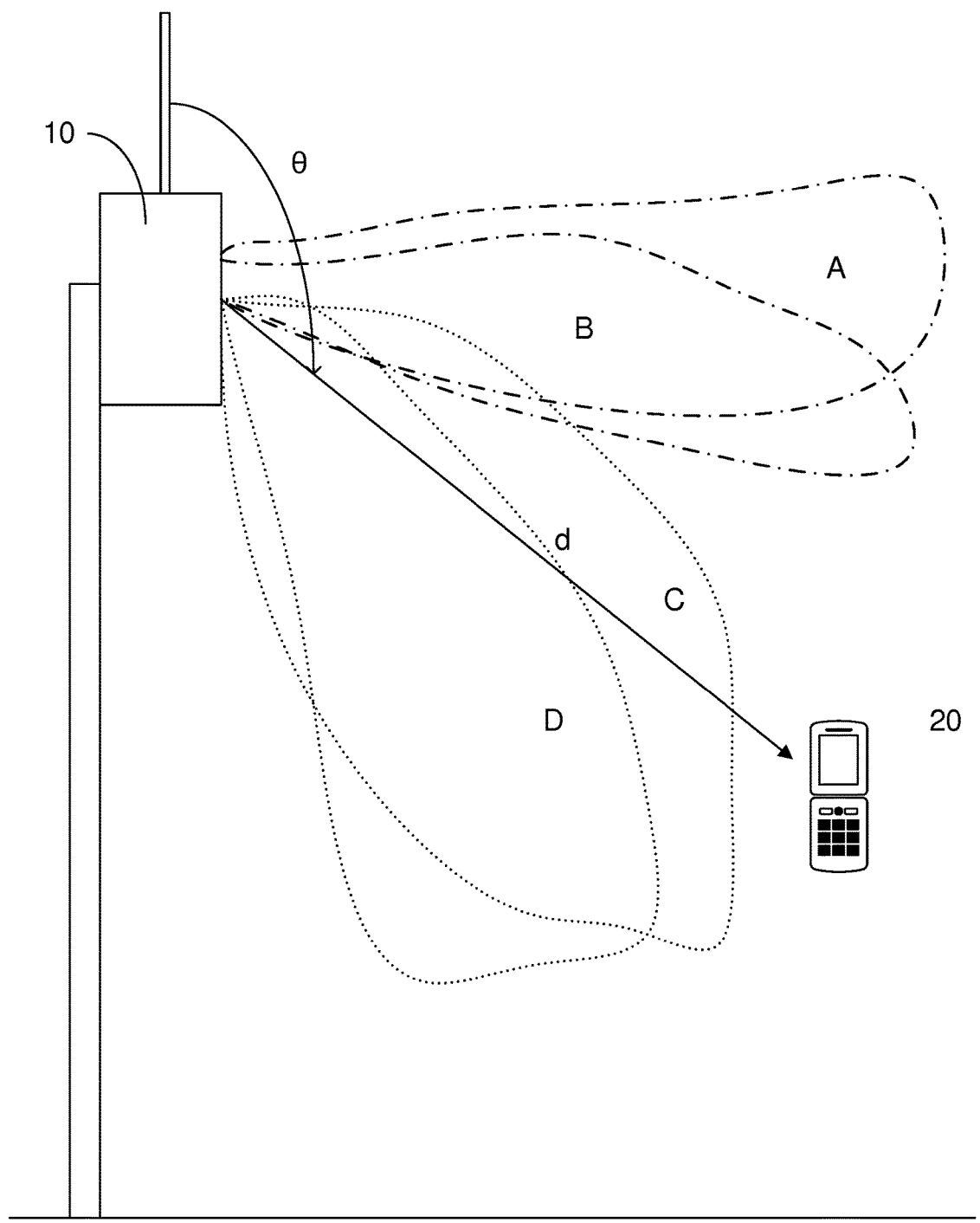
Figure 1C:
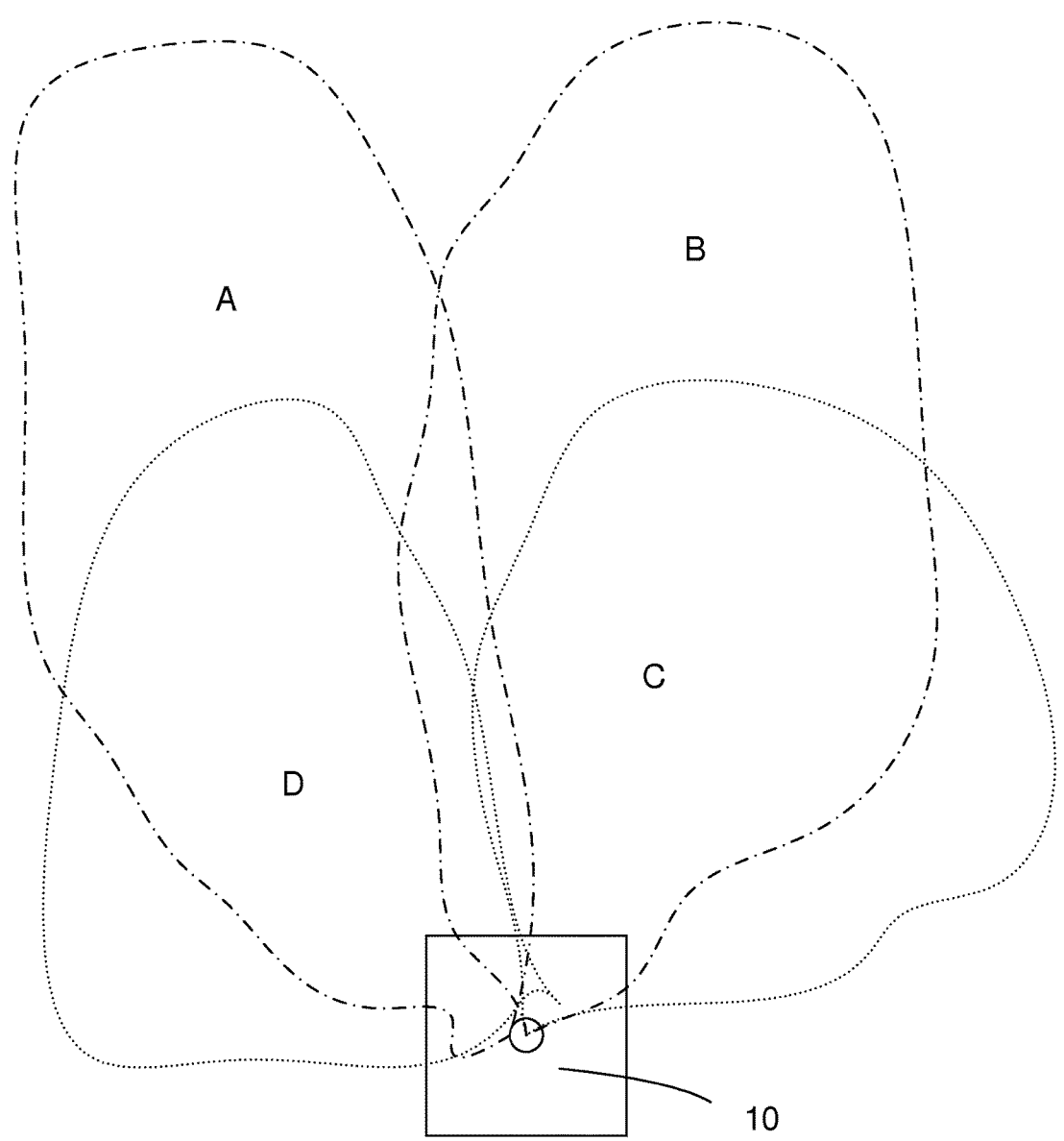

FIGS. 1b and c schematically illustrates a network node configured for a sector configuration with up to four sectors. FIG. 1b discloses a side view and FIG. 1c illustrates the corresponding sector configurations from a top view. Sector A and B illustrates two horizontal sectors essentially covering different regions in a horizontal plane. Sector C and D, illustrates two vertical sectors covering different regions in the vertical plane as compared to sector A and B.

The problem of how to optimally choose a sector configuration, e.g. to decide when it is beneficial to split a cell 13 into two sectors 13a, b is well known in the art. To a large extent, the optimal choice depends on the loads of the resulting sectors.

Figure 2A:
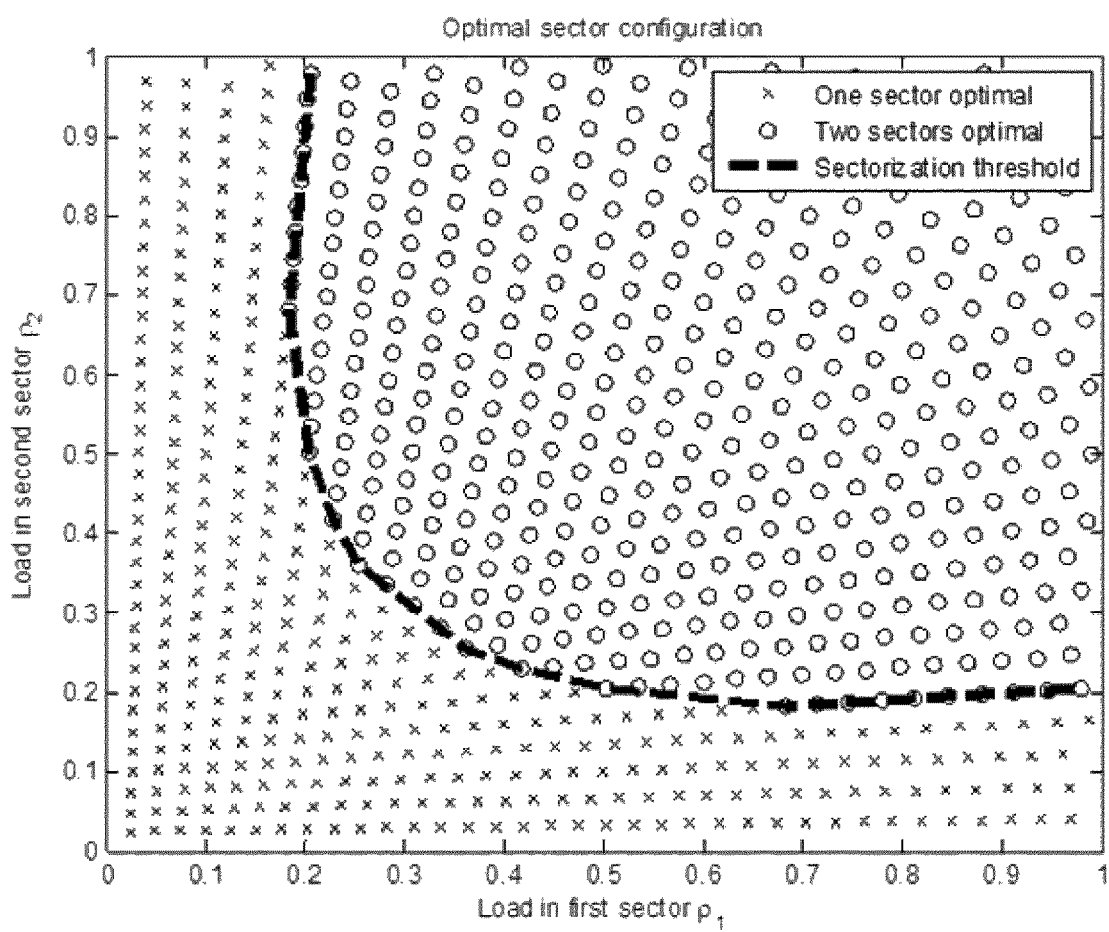
FIG. 2
a) discloses evaluations using a theoretical model of when two horizontal sectors perform better than one sector in terms of average user throughput,
b) discloses evaluations using a theoretical model of when two vertical sectors perform better than one sector in terms of average user throughput.

An example of how the sectorization decision depends on the loads of the resulting sectors is given in FIGS. 2a and b.

FIG. 2a discloses evaluations of the effect of a sectorization using a theoretical model. The evaluations are made for a horizontal sectorization, e.g. the horizontal sectors A and B as illustrated in FIGS. 1b and c. FIG. 2a illustrates a load for the two horizontal sectors. A performance threshold is indicated. For low loads or when the load is unevenly balanced between the resulting sectors, the Figure reveals that a configuration without a sector split is an optimal choice.

Figure 2B:
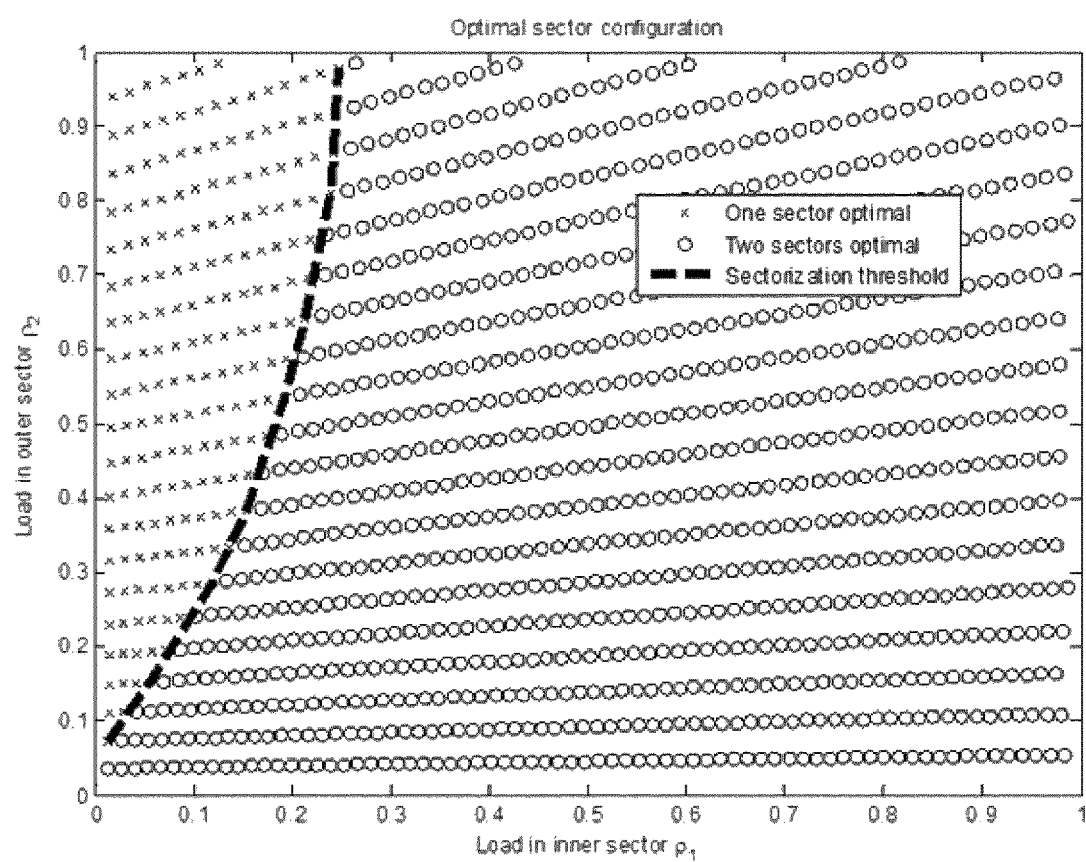

FIG. 2b discloses the effect of a sectorization using another theoretical model. The evaluations are made for a vertical sectorization, e.g. the vertical sectors A and D as illustrated in FIGS. 1b and c. FIG. 2b illustrates an estimated load for the two vertical sectors. A sectorization threshold is indicated as a function of the resulting loads of the inner and outer sector. Vertical sectorization is optimal largely depending on the resulting load of the inner cell.

As illustrated in the FIGS. 2a and b, one can express the "sectorization threshold" as a function of the resulting loads $\rho_1$ and $\rho_2$ of the respective sectors. That is, the threshold curve can be described as $f(\rho_1,\rho_2)=\lambda$. Based upon these results, a sectorization methodology could be defined as:

"Choose a sector configuration with one sector if $f(\rho_1,\rho_2) \leq \lambda$ and a sector configuration with two sectors otherwise".

As previously mentioned, it is known that the user distribution can help in taking a sectorization or antenna reconfiguration decision; see e.g. 3GPP TSG-RAN WG3 Meeting #86, San Francisco, USA, Nov. 17-21, 2014, R3-142715—Load information enhancements for AAS reconfiguration decisions. In this prior art presentation, the decision to sectorize or not to sectorize is based on fixed thresholds. The thresholds are based on predetermined input parameters, such as predicted load in inner and outer cells, predicted number of users in inner and outer cells etc. The thresholds are constant and predetermined either across the network or for a given cell.

Existing methods also include acquiring information about load for different sectors. The optimal sector configuration is dependent on the loads in the resulting sectors; with the general trend that sectorization is unbeneficial at low loads. It follows that the optimal sector configuration may vary over time. For example, different sector configurations may be optimal during different times of the day, due to time-varying traffic patterns.

The load of the resulting sectors will to a large extent depend on the distribution of users served by each sector, their traffic demand and their SINR. Load information may be acquired by sending out beam-formed reference signals, such as DRS or CSI-RS, and decide cell association of UEs based on measurement reports obtained from those reference signals. However, using DRS/CSI-RS for acquiring estimates about UE serving sectors creates overhead. Further, in case of a high number of possible sector configurations, many configurations need to be tried. Further, it is not supported by legacy UEs.

In order to truly enable the full benefits of sectorization, there is a need for improved adherence between sector set up and a current traffic situation in a wireless network, an ability to predict what resulting sectors' loads $\rho_1$ and $\rho_2$ will be without actually changing the sector configuration.

There is also a need for improvements in how to derive the sectorization threshold $f(\rho_1,\rho_2)=\lambda$. The optimal threshold will depend on a variety of factors, such as the geometry of the environment, the level of interference between the resulting sectors, the level of interference received from and imposed to adjacent cells in the network, among other things.

The present disclosure provides a method, performed in a network node, a network node for adaptively selecting an antenna sector configuration for an adaptive antenna system, AAS, solving the problem of adapting sectorization to a current traffic situation in the wireless network. The disclosure also provides a computer-readable storage medium, comprising a computer program, which when run in the network node causes the node to perform the method.

The techniques will now be described referring to FIGS. 3a and b illustrating example node operations in a network node.

It should be appreciated that the drawings comprise some operations which are illustrated with a solid border and some operations which are illustrated with a dashed border. Operations illustrated with solid border are operations which are comprised in the broadest example embodiment. Operations illustrated with dashed border are example embodiments which may be comprised in, or a part of, or are further embodiments which may be taken in addition to the operations and modules of the broader example embodiments. It should be appreciated that the operations need not be performed in order.

Figure 3A:
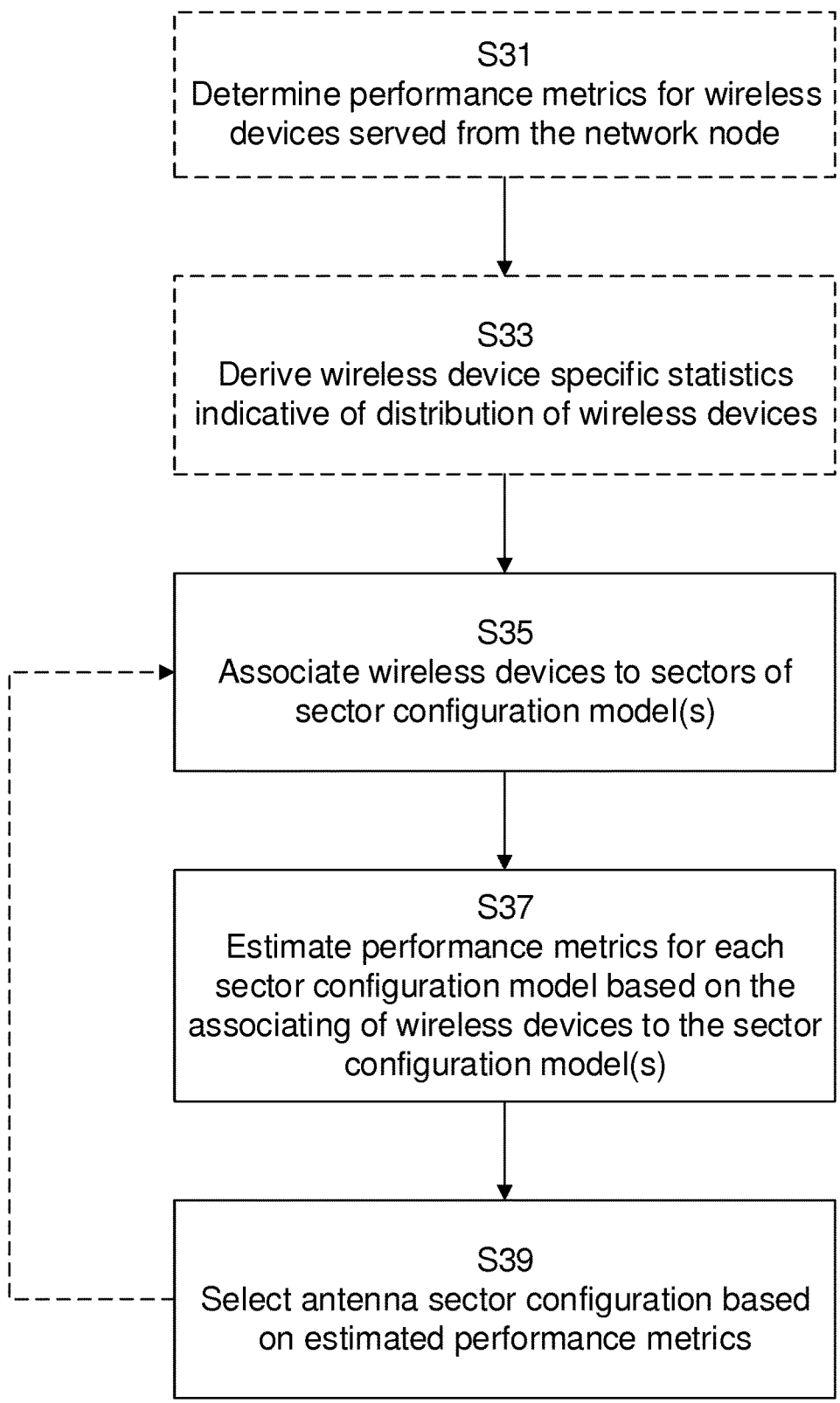
FIG. 3
a) is a flowchart schematically illustrating example node operations performed in a network node for selecting antenna sector configuration for an adaptive antenna system, AAS,
b) is a flowchart schematically illustrating aspects of the node operations.
Figure 3B:
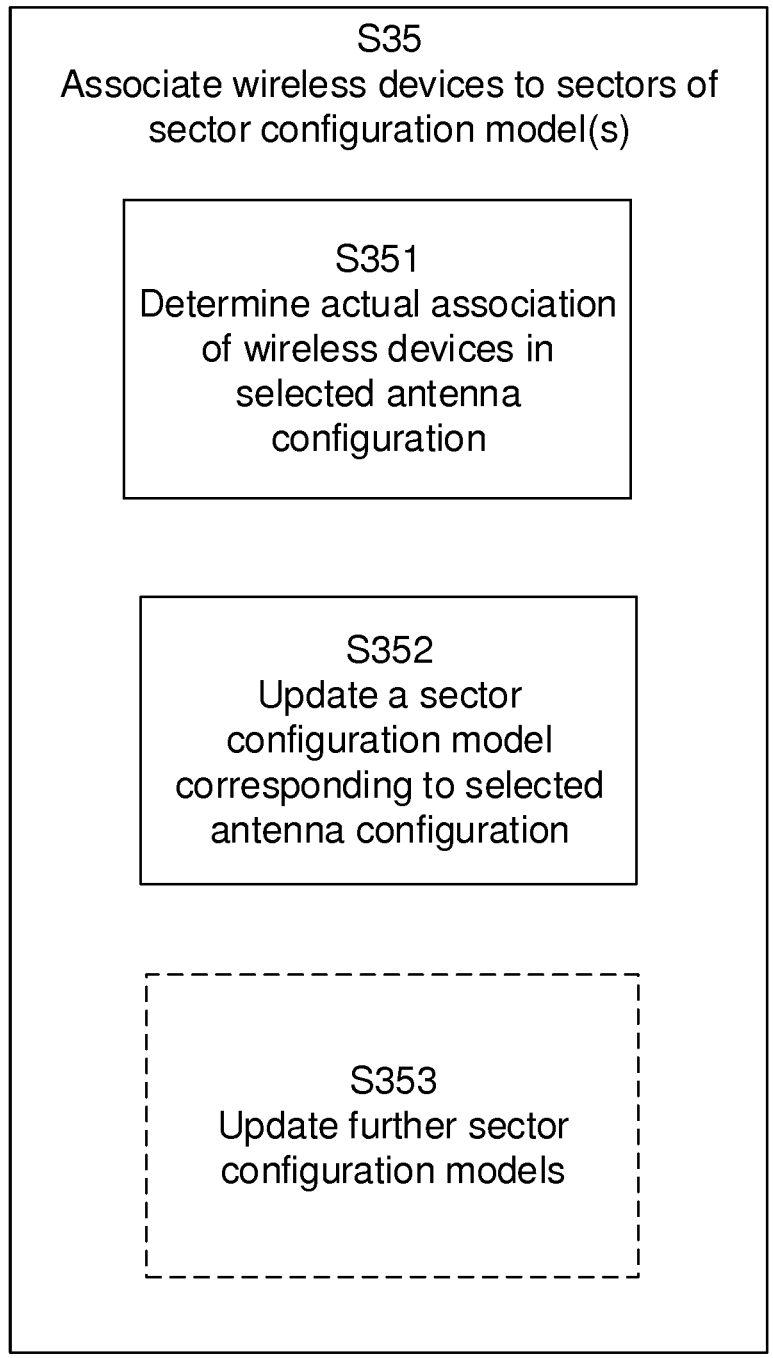

FIG. 3a illustrates example operations, performed in a network node, for selecting antenna sector configuration for an adaptive antenna system, AAS. In its broadest context, the selecting comprises a grouping operation, a performance estimation operation and a selection operation. In the grouping operation, wireless devices served from the network node are associated S35 to sectors of respective sector configuration models for each out of a number of sector configuration models. In the performance estimation operation, performance metrics for each sector configuration model are estimated S37 based on the associating of wireless devices to sectors of the respective configuration model. In the selection operation, an antenna sector configuration is selected S39 based on estimated performance metrics.

FIG. 3a also illustrates the optional example operations for determining performance metrics S31 for wireless devices served from the network node and deriving S33 wireless device specific statistics indicative of distribution of wireless devices. These operations will be further detailed in following exemplifying detailed disclosure of the example operations, but are optional operations in the context of the present disclosure.

In the following, the disclosure will exemplify a situation for wireless devices, also known as user equipments, UEs, served by an eNodeB/eNB, but is not limited to such a network configuration. An operation in a network node, will in the following description be presented as performed in an eNB, but is not to be perceived as limited to such a network configuration. The terms network node and eNB will be used in an interchangeable way. The same applies to the terms wireless device and user equipment, UE.

In the optional step of deriving S33 wireless device specific statistics indicative of a distribution of wireless devices served from the network node; the network node acquires statistics that is indicative of the distribution of UEs served by the eNodeB, e.g. geographical information about UEs which can be related to hypothetical geographical uptake areas of resulting sectors of a sector configuration model.

Having access to such statistics, the eNodeB is be able to estimate which resulting sector will serve each UE when a certain sector configuration is adopted, i.e. associate wireless devices served from the network node to sectors.

There is a variety of wireless device specific statistics that directly or in indirectly is indicative of a distribution of wireless devices. As indicated in FIG. 3a, performance metrics for wireless devices served from the network node are optionally determined in operation S31, whereupon the wireless device specific statistics are derived from the determined performance metrics. However, it is equally possible to derive the statistics from performance metrics already available to the network node, e.g. through performance measurements performed for an ongoing connection.

Statistics may include such that are derived from measurements by the eNodeB of signals transmitted by the UEs. Examples of such statistics are estimates of the propagation direction of the arriving radio signal, Azimuth of Arrival, AoA, estimates and Zenith of Arrival, ZoA, estimates. Such estimates provides input to which sector will serve which UE, if the sector uptake areas can be sufficiently described as areas in the angular domain. Turning back to FIG. 1b, a UE zenith angle θ is illustrated with respect to the eNB. The zenith angle θ is indicative of sectors suitable to serve the UE, wherein a large zenith angle θ may suggest that benefits could be achieved from a vertical sectorization.

Another example of statistics derived from measurements by the eNodeB is estimates of the propagation delay. The propagation delay is already calculated by the eNodeB in the form of the Timing Advance, TA, which is signalled back to the UE to align the uplink transmission. The TA value corresponds to the signal delay from a UE to the eNB. The eNB signals the TA to the UE to enable it to correct its timing so that the uplink signal received by the eNB is aligned properly in the subframe. Given the delay, we can then calculate the distance of the travelled path of the signal accordingly.

Wireless device specific statistics indicative of a distribution of wireless devices also include measurements by the UEs that are signalled back to the eNodeB, e.g. signal strength measurements, such as Reference Signal Received Power, RSRP measurements. Both signal strength and propagation delay may be indicative of the distance between the eNodeB and the UE. RSRP is a measure of signal strength, and the longer path the signal travels, the more attenuated it will be. Consequently, a lower RSRP could indicate a larger distance. However, this is a crude measure since a UE could be located close the eNB but in e.g. a basement and therefore have an attenuated signal as well, and then there's general shadowing to take into account, e.g. buildings blocking the signal path. However, there are techniques for improving an estimation of location based on RSRP, e.g. by using so called fingerprinting to get an estimate of the location. This requires you to first have created an RSRP "map" offline by driving around the area around the BS and collecting RSRP measurements and tagging each measurement with the location. Then, online, you can compare the RSRP measurement from the UE with your RSRP map to get an estimate of the location.

Turning back to the sector configurations models illustrated in FIGS. 1b and c, it is also appreciated that for certain sector configurations, such as ones comprising a combination of vertical and horizontal sectors, the distance d between the eNB and the UE could be a good indicator of which sector the UE will be served by. A UE with a shorter distance d to the eNodeB could more likely to be served by the lower vertical sector D while a UE at a larger distance to the eNodeB could be more likely to be served by the upper horizontal sector A.

The Precoder Matrix Indicator, PMI, which is calculated by the UE and signalled back to the eNodeB in the LTE standard, is another example of wireless device specific statistics indicative of the distribution of UEs. The PMI indicates which precoder to use from a set of possible precoders (a precoder codebook) for data transmission. The precoder is multiplied onto the signal prior to the antenna ports and basically sets a separate phase shift for each antenna. For some transmission modes and antenna configurations, the PMI may be indicative of the UE angular direction relative the eNodeB.

The derived wireless statistics collected may also include position measurements relating to the actual position of the UEs which can be either reported by the UE or can be estimated by the eNodeB.

It is of course also possible to derive the wireless specific statistics indicative of the distribution of wireless devices from combinations of the above disclosed examples.

In the broadest example operation, disclosed in FIG. 3a, radio network measurements are used to in the associating S35 of wireless devices to sectors of sector configurations models in a grouping operation. As disclosed above, such radio network measurements are optionally used in the form of wireless device specific statistics derived from radio network measurements.

Based on radio network measurements, e.g. derived wireless specific statistics as explained above, and a parametrizable grouping methodology, the eNodeB groups UEs by e.g. hypothetical served sector according to a sector configuration hypothesis comprising one or more sector configuration models. The sector configuration hypothesis is determined from a sectorization capability of the AAS, i.e. the one or more sector configuration models are determined from a sectorization capability of the AAS. The eNodeB performs the grouping for several sector configuration models or it can just consider one sector configuration model. According to an aspect of the disclosure that will be further exemplified below, the associating S35 of the wireless devices to the sectors of the respective sector configuration model is performed by comparing derived wireless device specific statistics to one more sectorization thresholds for the sectors of the respective configuration model.

In an exemplification of the grouping operation, the eNodeB only considers one sector configuration model, namely sectors A & D of a two sector configuration model comprising a horizontal sector A and a vertical sector D, as illustrated in FIGS. 1b and c. Based on radio network measurements, the eNodeB has derived statistics on the ZoA estimates $\hat{\theta}$ of its served UEs. The grouping methodology in this embodiment, where UEs are grouped in groups A and D to either be hypothetically served by sector A or sector D, can be described as a threshold, namely: a UE u is included in group A if $\hat{\theta}_u \leq \beta$ or it is included in group D if $\hat{\theta}_u > \beta$. Here, $\beta$ is the threshold level which is the parameter of this parametrizable grouping methodology. The threshold level is a predetermined, fixed threshold, or optionally, an adaptable threshold level $\beta$ as will be described further In general, any kind of grouping methodology that is based on any radio network measurements, e.g. any number of acquired statistics, may be used.

In another exemplification of the grouping operation, sectorization thresholds are defined for one or more parameters representative of respective uptake areas for sectors in a sector configuration model; wherein the wireless device specific statistics is derived for the one or more parameters. In an example using sectorization thresholds for one or more parameters, an eNB considers a sector configuration hypothesis comprising a sector configuration model consisting of four sectors A-D as is illustrated in FIGS. 1b and c. In this example, the eNodeB has acquired statistics on the AoA estimates $\hat{\Phi}$, the ZoD estimates $\hat{\theta}$ and the timing advance TA of its served UEs. The grouping methodology used in this embodiment may be described as If $\hat{\phi}_u < \beta_1$ group UE u in group A or D, otherwise in group B or C.

If $\beta_2 \cdot TA_u + \beta_3 \cdot \hat{\theta}_u \leq \beta_4$, group UE u in group D or C, otherwise in group A or B.

Here, the coefficients $\beta_1, \beta_2, \beta_3, \beta_4$ are the parameters of this parametrizable grouping methodology using a sectorization threshold $\beta$. In the context of the present disclosure, the coefficient $\beta_1$ may be perceived as one sectorization threshold representing a sectorization between a first subset and second subset of sectors in the sector configuration model. The coefficient $\beta_1$ is defined for a parameter representative of a sector configuration with uptake areas essentially in a horizontal direction. In accordance with the example presented above, the first subset of sectors includes sectors A and D and the second subset includes sectors B and C, the sectorization threshold determining a grouping of UEs in either the subset of A and D or in the subset of B and C, i.e. grouping in different uptake areas as seen in a horizontal plane.

Another sectorization threshold, here presented as a combination of second, third and fourth threshold coefficients $\beta_2, \beta_3, \beta_4$, represents a sectorization between a third and fourth subset of sectors in the sector configuration; the third and/or fourth subset of sectors including sectors of the first and/or second subset. In accordance with the example presented above, the third subset of sectors includes sectors C and D and the fourth subset includes sectors A and B, the sectorization threshold being representative of a grouping in a sector configuration model comprising vertical uptake areas.

It should be noted that there does not need to be a correspondence between the different UE groups and the hypothetical sectors of the sector configuration models for every sector configuration model of the sector configuration hypothesis. For instance, the number of UE groups could be two, while the number of hypothetical sectors could be 5 for some sector configuration models. However, there should be a correspondence for at least one of sector configuration model used in the association step.

The eNodeB performs the grouping of UEs for one or more sector configuration models. That is, for each considered sector configuration model, the eNodeB performs a UE grouping. The grouping is performed using different grouping methodologies for respective sector configuration models or using the same grouping methodology for all models.

The different sector configuration models of the sector configuration hypothesis may correspond to a different number of sectors per dimension, such as "two vertical sectors", "two horizontal sectors" or "three sectors in horizontal dimension and two sectors in vertical dimension". According to an aspect of the disclosure, the sector configuration models are modelled with the same number of sectors per dimension but with differences with regard to other parameters, such as antenna beam shapes or power distribution between sectors. An example is "two vertical sectors with main lobes pointing at zenith angles 102° and 118° or "two vertical sectors with main lobes pointing at zenith angles 95° and 108°". Thus, the present disclosure is applicable to any type of sector configuration model that is valid based on the sectorization capability of the AAS.

In accordance with the broad example operation, disclosed in FIG. 3a, the method of selecting an antenna configuration for the AAS further comprises the operations of estimating S37 performance metrics for each sector configuration model based on the associating of wireless devices to sectors of the respective sector configuration model and selecting S39 an antenna sector configuration of the AAS based on the estimated performance metrics.

Thus, taking the output of the association operation into consideration, performance metrics relating to the radio network as a whole, are estimated based on the assumed grouping of wireless devices to the different sector configuration models. Performance metrics are presumably determined for each sector configuration model considered during the association operation, but in an instance where a given sector configuration model is no longer available for the adaptive antenna system, e.g. due to problems in the antenna system, it is considered to be within the scope of the present disclosure to estimate performance metrics for each sector configuration model that represents an operational sector configuration model. The performance metrics are estimated for each sector configuration model as applied to the wireless devices served from the network node and based on the association. In the example of FIGS. 1b and c, performance metrics are estimated for a sector configuration model where all wireless devices are associated to a sector A, for a sector configuration model where the wireless devices are associated to horizontal sectors A and B, for a sector configuration model where the wireless devices are associated to vertical sectors A and D, or any other suitable sector configuration model having associated wireless devices.

Performance metrics are estimated based on input of values that are functions of a radio network statistic for the different UE groups, such as e.g. throughput, load, latency, Signal to Noise and Interference Ratio, SINR, and/or RSRP. Such radio network statistics includes, for example, instantaneous values, time-averaged values or predictions of what the values for the UE group will be following selection of an antenna sector configuration.

A prediction of, for example, future load values of the different UE groups in one or more sector configuration models, may be estimated by taking the time-averaged values and applying a rescaling, taking into account a change in SINR of said UE groups that may occur if the sector configuration is changed.

The selecting of an antenna sector configuration of the AAS is performed based on the estimated performance metrics, e.g. based on a comparison of estimated performance metrics for each configuration model, a comparison of the estimated performance metrics for each configuration model and the determined performance metrics for wireless devices served from the network node, or a comparison of the estimated performance metrics and a configurable performance threshold. This implies that the selection of an antenna sector configuration for the AAS is an outcome of a decision to initiate sectorization in a cell, change sectorization in a cell or cease sectorization in a cell. According to aspects of the disclosure, selection of the antenna sector configuration of the AAS comprises selecting one of the sector configuration models considered in the grouping and estimating operations, but the selection of an antenna sector configuration model for the AAS also comprises de-selecting a previously selected sector configuration model or continuing with an unchanged antenna sector configuration model, e.g. wherein the eNB provides coverage in one cell only.

The above disclosed example operations for selecting an antenna sector configuration for an AAS, do not depend on a particular methodology for deciding when to sectorize or not. The above exemplified grouping operation, performance estimation operation and a selection operation are applicable to a state of the art sectorization methodology where fixed, predetermined thresholds for specific parameters are used as a basis for the one or more sectorization models; providing the conditions for the decision to sectorize. However, the operations are also applicable to an adaptive sectorization methodology that will be disclosed in detail below. According to an aspect of the present disclosure, the method of selecting antenna configuration for an AAS also comprises adjusting parameters of the sector configuration models to allow for the use of adaptive sector configuration models, e.g. by adjusting the parameters that have been used when selecting an initial antenna sector configuration model, or by including additional parameters to define the prerequisites for the sector configuration models that are being considered. Operations for enabling adaptive update of one or more sectorization models comprises the operation of determining S351 an actual association of wireless devices to sectors of the selected antenna sector configuration, and updating S352 a sector configuration model based on the determined performance metrics. Thus, following selection and operation of an eNB using the selected antenna sector configuration of the AAS, an actual traffic distribution of UEs in the antenna sectors is determined.

Consequently, the determining of an actual association of wireless devices to the sectors and updating the selected sector configuration model based on this actual association and performance metrics determined for the actual association, allows the eNodeB to adjust the parameters of the parametrizable grouping methodology, i.e. adjusting the threshold parameters of the sectorization models.

We illustrate this by an exemplary embodiment, in a sectorization environment of FIGS. 1b and c. In this embodiment, UEs are grouped in groups A and D to either be hypothetically served by sector A or hypothetically served by sector D by comparing estimated UE ZoA angles $\hat{\theta}$ with a threshold $\beta$. A UE u is included in group A if the $\hat{\theta}_u \leq \beta$ or it is included in group D if $\hat{\theta}_u > \beta$. When performing the operation of adjusting the parameters of sectorization threshold, the actual outcome from selecting a specific sector configuration model is determined. In this step, ZoA estimates are acquired again for the UEs actually served by sector A and sector D respectively. The parameter $\beta$, i.e. the sectorization threshold of this grouping operation, is then adjusted to better correspond to ZoA angles of the UEs in each resultant sector, so that next time the grouping methodology is used, a better grouping may be formed. For instance, the grouping methodology parameters in this embodiment may be adjusted as $$\beta_{new} = \max_{\beta} \sum_{u \in A: \hat{\theta}_u > \beta} \left(\hat{\theta}_u - \beta\right)^2 + \sum_{u \in D: \hat{\theta}_u \leq \beta} \left(\beta - \hat{\theta}_u\right)^2.$$

It may be especially difficult to derive a correct threshold value for the grouping methodology if a statistic indicative of distance of a UE to the base station, such as RSRP or TA, is used as input to derive a grouping for two or more vertical sectors. Hence, the proposed adaptive grouping methodology may be an enabler for the use of such statistics to predict e.g. load values to input to a sectorization methodology.

If optimizations of the beam shapes of the different sectors have been performed by the eNodeB, this may be taken into consideration when updating the parameters of the sectorization threshold. Here two situations are exemplified.

In the first example, the different sector configuration models correspond to a different number of sectors per dimension, such as "two vertical sectors", "two horizontal sectors" or "three sectors in horizontal dimension and two sectors in vertical dimension". We assume an example where the sector configuration was changed to two sectors A and D when selecting an antenna sector configuration, as disclosed in operation S39, in FIG. 3a. The two vertical sectors had default beam zenith directions $\theta_A$ and $\theta_D$. When changing to "two vertical sectors", optimizations of the beam zenith directions were performed, resulting in new sector beam zenith directions $\tilde{\theta}_A$ and $\tilde{\theta}_D$. The eNodeB may now update the default beam zenith directions to $\tilde{\theta}_A$ and $\tilde{\theta}_D$ for this sector configuration model. The adaptive adjustment of the parameters of the sectorization thresholds for this sector configuration model may now take into consideration that the default beam zenith directions may have changed.

In the second example, the different sector configuration hypotheses corresponds to hypotheses with the same number of sectors per dimension but with different antenna beam shapes, such as "two vertical sectors with main lobes pointing at zenith angles 102° and 118°" or "two vertical sectors with main lobes pointing at zenith angles 95° and 108°". We assume an example where the sector configuration was changed to "two vertical sectors with main lobes pointing at zenith angles $\theta_A$ and $\theta_D$" when selecting an antenna sector configuration of the AAS. When changing, optimizations of the beam zenith directions were performed, resulting in new sector beam zenith directions $\tilde{\theta}_A$ and $\tilde{\theta}_D$, thus effectively resulting in a new sector configuration model. When updating the parameters of the sectorization threshold for the selected sector configuration model, the eNodeB may now update the sectorization thresholds corresponding to the sector configuration model of the sector configuration with zenith angles $\theta_A$ and $\theta_D$ as well as the sector configuration model of the sector configuration with zenith angles $\tilde{\theta}_A$ and $\tilde{\theta}_D$. Thus, based on an actual association of wireless devices in the selected antenna configuration, one or more sectorization thresholds of further sector configuration models, apart from the selected model, are optionally updated.

As previously mentioned, the present disclosure also relates to updating a sectorization model. Operations for enabling an update of one or more sectorization models are based on an outcome from using one or more initial performance thresholds to choose which sector configuration that should be adopted. The one or more sectorization thresholds, used in a selected sector configuration model, are then iteratively updated each time the sector configuration is changed by taking into account if the performance increased or decreased when the sector configuration changed. By iteratively updating one or more sectorization thresholds based upon this feedback, the thresholds may converge to different optimal values for each cell in the network.

It is not a trivial problem to derive the optimal threshold parameters since they depend on a variety of factors. The optimal values of the parameters will probably be different for each cell in the network and may even vary over time.

The proposed method tries to solve this by, in a first step, using some initial values for said parameters, and then adaptively updating said parameter values each time the sectorization methodology is used to change the sector configuration.

We continue with giving some more examples of different parametrizable sectorization methodologies.

In a first example, a performance threshold is modelled as a linear function of the loads of the resulting sector:

The current sector configuration consists of one sector.

The considered sector configuration hypothesis consists of two sectors A & B.

The sectorization methodology consists of changing the sector configuration to the sectorization configuration hypothesis if the sectorization metric $\lambda_1\rho_A+\lambda_2\rho_B \geq \lambda_3\rho$. $\rho_A$ is a load estimate of sector A, $\rho_B$ is a load estimate of sector B and $\lambda_1, \lambda_2, \lambda_3$ are coefficients that constitute the parameters of the sectorization methodology.

If several sector configuration models are considered, a sectorization methodology may in one embodiment consist of calculating a metric for each sector configuration model (as well as for the current sector configuration), and choosing to adopt the sector configuration model which has the largest metric.

In another example, a pair-wise metric is calculated for each pair of possible sector configuration models (also including the current sector configuration). The metric $M_{(i,j)}$ for each pair (i,j) depend on the estimated statistics of the users in the respective sectors. Each metric indicates which sector configuration hypothesis in the pair is the better one. The pairs are then evaluated in order to choose a winning sector configuration hypothesis to be adopted.

An example is given below for the sectorization illustrated in FIGS. 1b and c:

The current sector configuration consists of one sector (sector configuration model 0).

The considered sector configuration models are "two sectors A & B" (Sector configuration model 1) and "two sectors C & D" (Sector configuration model 2).

The sectorization metric corresponding to a configuration pair is calculated as $M_{(0,1)}=\lambda_1\rho_A+\lambda_2\rho_B-\lambda_3$ where $\rho_A$ and $\rho_B$ are the load estimates corresponding to sector A and B respectively, just as in the previous example. If $M_{(0,1)} \geq 0$, configuration model 1 is preferred over configuration model 0 and vice versa.

The sectorization metric corresponding to configuration pair (0, 2) is calculated as $M_{(0,2)}=\lambda_4\rho_C+\lambda_5\rho_D+\lambda_6 \cdot SINR_C+\lambda_7 \cdot SINR_D-\lambda_8$ where $\rho_C$ and $\rho_D$ are the loads corresponding of sector C and D respectively and $SINR_D$ & $SINR_D$ are the average SINRs corresponding to UEs in said sectors. If $M_{(0,2)} \geq 0$, configuration 2 is preferred over configuration 0 and vice versa.

The sectorization metric corresponding to configuration pair (1,2) is calculated as $M_{(1,2)}=\lambda_9\rho_B+\lambda_{10} \cdot (SINR_c+SINR_D)-\lambda_{11}$ If $M_{(0,1)} \geq 0$, configuration 2 is preferred over configuration 1 and vice versa.

The preferred sector configuration is then derived by calculating the pair-wise metric in turn.

Here $\lambda_1, \lambda_2, \ldots, \lambda_{11}$ are the parameters of the sectorization methodology that may be adaptively updated. Note that all parameters may not need to be adaptively updated; rather, just updating a subset of the parameters may be sufficient to achieve good performance.

After taking a decision to change the sector configuration, the eNodeB may update the parameters of the sectorization threshold used in the parametrizable sectorization methodology for the adopted sector configuration. In a typical embodiment, the eNodeB wants to assess the performance of the adopted sector configuration compared to the performance of the previously used sector configuration. The performance is measured with respect to some metric corresponding to a radio network performance indicator. Such radio network performance indicators may include, but is not limited to, spectral efficiency, user throughput, network capacity, and/or dropped call rate. Said radio network performance indicators may be collected for different statistics areas. Different statistics areas may include neighbouring cells in the network as well as the sectors served by the given eNodeB. The different statistics areas may also include sub-groups of UEs, such as cell-edge UEs.

Figure 4:
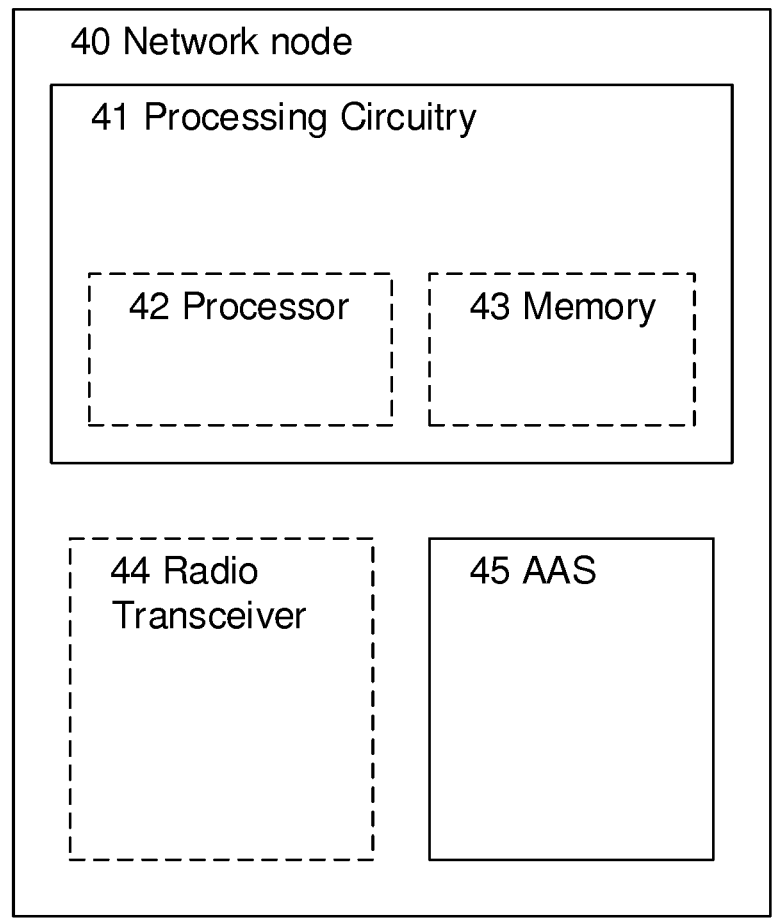
FIG. 4 is a block diagram illustrating an example node configuration for performing the node operations.

FIG. 4 illustrates an example network node 40 comprising processing circuitry 41 operative to select antenna sector configuration for an adaptive antenna system 45, AAS, of the network node; illustrating an example node configuration for performing the previously discussed operations.

The network node is typically a radio network node or radio base station, e.g. an eNB in LTE. The network node 40 comprises processing circuitry 41 and an AAS 45. The processing circuitry may be by any suitable Central Processing Unit, CPU, microcontroller, Digital Signal Processor, DSP, etc. capable of executing computer program code. As a general note, the processing circuitry of the network node may in part be comprised in a plurality of cooperating entities, e.g. using a cloud solution for some of the node operations. Consequently, the term network node should be interpreted in broad context.

The processing circuitry is configured to perform the example operations illustrated in FIGS. 3a and b, illustrating a method of selecting antenna sector configuration for an AAS. When executing the example operations, the processing circuitry is adapted to associate wireless devices served from the network node to sectors of a respective sector configuration model based on radio network measurements; association performed for each out of a number of sector configuration models. The processing circuitry is further adapted to estimate performance metrics for each sector configuration model based on the associating of wireless devices to sectors of the respective sector configuration model and to select an antenna sector configuration of the AAS based on the estimated performance metrics.

In an example embodiment, the processing circuitry comprises a processor 42 and a memory 43 configured to store a computer program, which when run in the processor causes the network node to perform the antenna sector configuration selection. In a further example embodiment, the network node comprises a radio transceiver 44 configured for radio communication with one or more wireless devices served by the network node.

Figure 5:
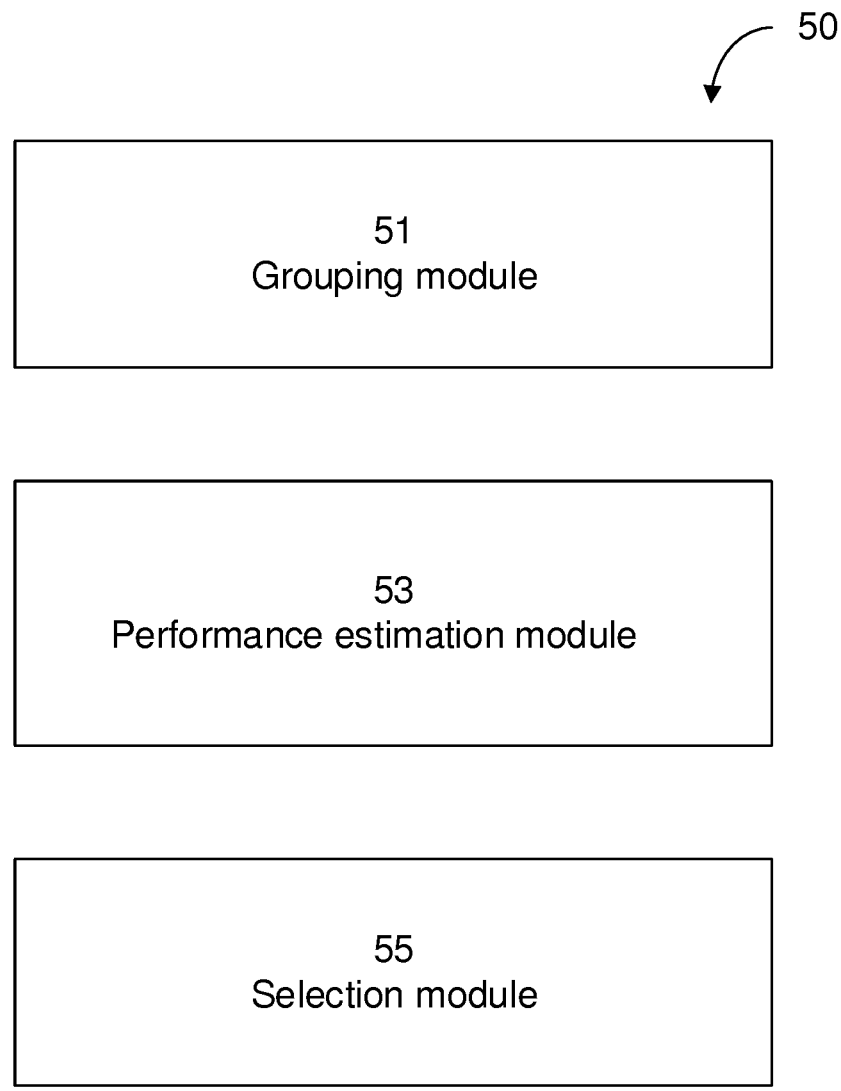
FIG. 5 is a block diagram illustration example modules for performing the node operations.

FIG. 5 discloses a block diagram schematically illustrating an exemplary network node 50 arranged to select antenna sector configuration for an adaptive antenna system. The network node comprises one or several of:

a grouping module 51 configured to associate wireless devices served from the network node to sectors of a respective sector configuration model based on radio network measurements, wherein the association is performed for each out of a number of sector configuration models;

performance estimation module 53 configured to estimate performance metrics for each sector configuration model based on the associating of wireless devices to sectors of the respective sector configuration model; and a selection module 55 configured to select an antenna sector configuration of the AAS based on the estimated performance metrics.

The modules 51, 53 and 55 are implemented in hardware or in software or in a combination thereof. The modules are according to one aspect implemented as a computer program stored in a memory which runs on a processor, e.g. the memory and processor disclosed for FIG. 4. The network node is further configured to implement all the aspects of the corresponding operations.

It should be noted that although terminology from 3GPP LTE has been used herein to explain the example embodiments, this should not be seen as limiting the scope of the example embodiments to only the aforementioned system. Alternative or future wireless systems having adaptive antenna systems may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software.

Also note that terminology such as user equipment should be considered as non-limiting. A device or user equipment as the term is used herein is to be broadly interpreted to include any device capable of being served by one or more sectors of a network node.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method, performed in a network node, of selecting an antenna sector configuration for an adaptive antenna system (AAS) of the network node, the method comprising:
for each of a plurality of sector configuration models, each sector configuration model having one or more sectorization thresholds:
associating wireless devices served from the network node to sectors of the respective sector configuration model based on radio network measurements; and
estimating performance metrics for each sector configuration model based on the associating of wireless devices to sectors of the respective sector configuration model;
selecting an antenna sector configuration of the AAS based on the estimated performance metrics;
transmitting signals to one or more of the wireless devices using the selected antenna sector configuration of the AAS;
updating the sector configuration model that corresponds to the selected antenna configuration of the AAS based on an actual association of the wireless devices to sectors of the selected antenna sector configuration; and
updating one or more additional sector configuration models in the plurality of sector configuration models based on the estimated performance metrics.

2. The method of claim 1, further comprising determining performance metrics for wireless devices served from the network node.

3. The method of claim 1, wherein the wireless device specific statistics are indicative of a distribution of wireless devices served from the network node.

4. The method of claim 3, wherein the wireless device specific statistics are derived from wireless device measurements received in the network node, the wireless device measurements comprising Reference Signal Received Power measurements, Precoder Matrix Indicator measurements, position measurements, and/or timing advance measurements.

5. The method of claim 3, wherein the wireless device specific statistics are derived from network node measurements comprising propagation direction and/or propagation delay of the radio signal received from the wireless device.

6. The method of claim 2, further comprising associating the wireless devices to the sectors of the respective sector configuration model by comparing the derived wireless device specific statistics to the one or more sectorization thresholds for the sectors of the respective sector configuration model.

7. The method of claim 6:
wherein the one or more sectorization thresholds are defined for one or more parameters representative of respective uptake areas for sectors in a sector configuration model; and
wherein the wireless device specific statistics are derived for the one or more parameters.

8. The method of claim 6, wherein one sectorization threshold represents a sectorization between first and second subset of sectors in a sector configuration model.

9. The method of claim 1, further comprising selecting an antenna sector configuration of the AAS based on a comparison of the estimated performance metrics for each configuration model.

10. The method of claim 2, wherein selecting an antenna sector configuration of the AAS comprises selecting the antenna sector configuration based on a comparison of the estimated performance metrics for each configuration model and the determined performance metrics for the wireless devices served from the network node.

11. The method of claim 1, wherein selecting an antenna sector configuration of the AAS comprises selecting the antenna sector configuration based on a comparison of the estimated performance metrics and a configurable performance threshold.

12. The method of claim 1 wherein each sector configuration model comprises one or more sectorization thresholds, and wherein updating the sector configuration model that corresponds to the selected antenna configuration of the AAS comprises:
determining feedback information indicating whether performance for the sector configuration model that corresponds to the selected antenna sector configuration increases or decreases; and
iteratively updating the one or more sectorization thresholds for the sector configuration model that corresponds to the selected antenna sector configuration based on the feedback information.

13. A network node, comprising:
processing circuitry operative to select an antenna sector configuration for an adaptive antenna system (AAS) of the network node;
wherein the processing circuitry comprises a processor and memory;
wherein the memory comprises instructions executable by the processor whereby the network node is operative to:
for each of a plurality of sector configuration models:
associate wireless devices served from the network node to sectors of the respective sector configuration model based on radio network measurements; and
estimate performance metrics for each sector configuration model based on the associating of wireless devices to sectors of the respective sector configuration model;
select an antenna sector configuration of the AAS based on the estimated performance metrics; and
transmit signals to one or more of the wireless devices using the selected antenna sector configuration of the AAS;
update the sector configuration model that corresponds to the selected antenna configuration of the AAS based on an actual association of the wireless devices to sectors of the selected antenna sector configuration; and
update one or more additional sector configuration models in the plurality of sector configuration models based on the estimated performance metrics.

14. A non-transitory computer readable recording medium storing a computer program product for selecting antenna sector configuration for an adaptive antenna system (AAS) of a network node, the computer program product comprising software instructions which, when run on processing circuitry of the network node, causes the network node to:
for each of a plurality of sector configuration models:
associate wireless devices served from the network node to sectors of the respective sector configuration model based on radio network measurements; and
estimate performance metrics for each sector configuration model based on the associating of wireless devices to sectors of the respective sector configuration model;
select an antenna sector configuration of the AAS based on the estimated performance metrics; and
transmit signals to one or more of the wireless devices using the selected antenna sector configuration of the AAS;
update the sector configuration model that corresponds to the selected antenna configuration of the AAS based on an actual association of the wireless devices to sectors of the selected antenna sector configuration; and
update one or more additional sector configuration models in the plurality of sector configuration models based on the estimated performance metrics.

* * * * *